Dec. 23, 1952
L. W. RITTENHOUSE
2,623,091
MOUNTING FOR ELECTRICAL UNITS
Filed May 10, 1950
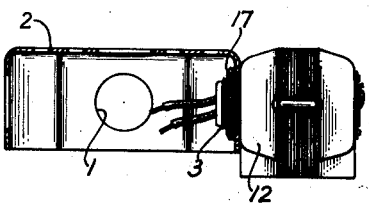
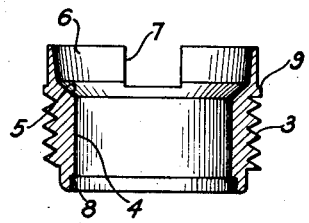
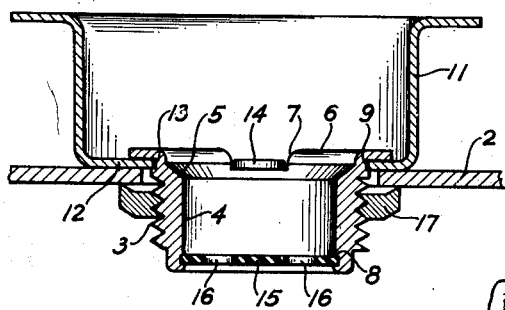
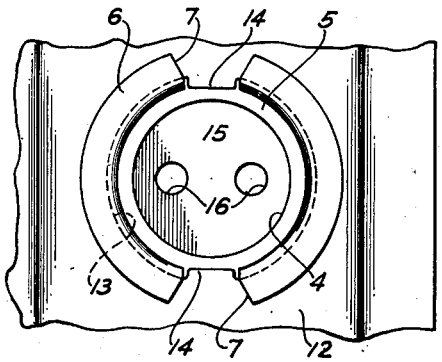
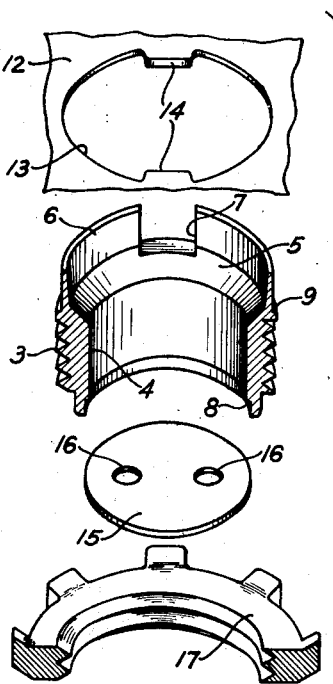
INVENTOR
LLOYD W. RITTENHOUSE
BY Harold E. Stonebraker
ATTORNEY Patented Dec. 23, 1952

2,623,091

UNITED STATES PATENT OFFICE 2,623,091

MOUNTING FOR ELECTRICAL UNITS

Lloyd W. Rittenhouse, Honeoye Falls, N. Y., assignor to The Rittenhouse Company, Inc., Honeoye Falls, N. Y., a corporation of New York Application May 10, 1950, Serial No. 161,176

1 Claim. (Cl. 174—62)

This invention relates to a mounting for electrical units, and has for its object to afford an economical and efficient structure for easily and securely attaching a bell-ringing transformer or other small electrical device to an outlet box or to any knock-out opening to which it is desirable to have it fastened.

Various structures have been proposed for the attachment of transformers and such electrical devices to outlet boxes but in all such cases the parts have been difficult to secure in some positions, the structures have been costly to manufacture, and the transformer has not always been retained firmly in position on the outlet box or easily removed and replaced, and it is a more particular purpose of the invention to provide a mounting of strong but light weight construction that can be produced at minimum cost, can be easily and quickly attached to an outlet box or through any knock-out opening regardless of the position in which the transformer is to be arranged, and which makes it possible for the transformer to be held firmly, rigidly, and permanently in place.

A further purpose of the invention is to afford an arrangement which adds no appreciable cost to the production of the transformer shell or housing and requires in its manufacture only a nipple that can be produced on a screw machine and readily secured to the transformer shell in a rigid and permanent manner, thus reducing to a minimum the cost of producing a complete bell transformer assembly.

More particularly, the invention has for its purpose to so construct and secure the nipple to the transformer shell that when the nipple is drawn tightly through the outlet box, the transformer shell is not distorted in any way and there is no tendency to bend the shell into the opening of the outlet box through which the nipple extends.

To these and other ends, the invention consists in the construction and arrangement of parts that will appear clearly from the following description when read in conjunction with the accompanying drawings, the novel features being pointed out in the claim following the specification.

In the drawings:

Fig. 1 is a sectional view taken through an outlet box showing attached thereto a bell transformer constructed in accordance with a preferred embodiment of the invention;

Fig. 2 is an enlarged sectional view taken through a portion of the transformer shell or housing, and showing the relative positions of the outlet box wall and the attaching nut when threaded on the nipple;

Fig. 3 is an enlarged sectional view of the nipple before attachment to the transformer shell;

Fig. 4 is a view in elevation looking downwardly in relation to Fig. 2, and

Fig. 5 is an exploded perspective view of the parts shown in Fig. 2.

Referring more particularly to the drawings in which like reference numerals refer to the same parts throughout the several views, the invention has to do with mounting means for a bell-ringing transformer or other small electrical device that is detachably secured through the opening 1 of an outlet box 2, or to any other convenient knock-out opening to which it is desirable to fasten such an electrical device, and the structure forming the subject matter of the invention includes a light weight nipple formed of metal, either steel or brass, on a screw machine, and constructed initially as shown in Fig. 3.

The nipple includes an exteriorly threaded portion 3, an interior cylindrical surface 4 terminating at one end in an inclined shoulder 5, and relatively thin arcuate oppositely disposed flanges 6, each having a cylindrical outer surface and an inclined inner surface forming a tapering cross-section, see Fig. 3, the arcuate flanges 6 being separated by recesses or notches 7 for a purpose that will appear presently, while at its other end the cylindrical surface 4 of the nipple terminates in a shoulder 8. The outer periphery of the nipple at its inner end, referring to Fig. 3, is of slightly reduced diameter, affording a shoulder 9 for a purpose that will appear presently, and the nipple of the form substantially as described above and as shown in Fig. 3 is formed on a screw machine and secured to the housing or shell of the transformer housing in the manner that will now be described.

The transformer housing or shell is shown at 11, see Fig. 2, its outer wall 12 being provided with an opening 13 to receive the nipple, the wall 12 being provided with radially extending lugs or projections 14 arranged oppositely as shown in Fig. 5 to interlock with the opposite recesses 7 in the nipple. When assembling the parts, a closure 15 of fiber or suitable insulating material, with openings 16 through which the conductors from the transformer extend, is inserted within the nipple from its outer end until it rests against the bottom shoulder 8 and the end of the nipple then rolled or crimped over the closure 15 to hold it against the shoulder 8.

The nipple is then inserted through the opening 13 in the wall 12 of the transformer shell, while positioned so that the lugs or projections 14 project into the cut-away portions or recesses 7 and interlock therewith, and the nipple is then pushed through the opening 13 of the transformer shell wall 12 until the latter engages the shoulder 9, whereupon the tapered arcuate flanges 6 are rolled outwardly and downwardly into intimate engagement with the adjacent surface of the wall 12 of the transformer shell surrounding the opening 13, see Fig. 2. Thus the outwardly turned flanges 6 of the nipple engage the wall 12 of the transformer shell on its inner surface while the outer surface of the wall 12 butts against the shoulder 9, and thus the nipple is securely, rigidly, and permanently attached to the shell.

The transformer constructed with a housing or shell as just described is attached to an outlet box by inserting the exposed threaded end of the nipple through the opening in the outlet box or other knock-out opening, and the transformer is then fastened to the outlet box by threading a conventional conduit lock nut 17 on to the threaded portion of the nipple until it is tightly engaged with the adjacent surface of the outlet box.

The nipple fits loosely in the opening in the outlet box, the opening being substantially larger than the nipple in order to permit easy insertion and assembly, and consequently when the nut 17 is turned down tightly against the wall of the outlet box, there would be a tendency to force and bend the adjacent edge of the transformer shell or housing into the opening of the outlet box unless provision is made to prevent such action, and in the present structure, this is obviated by making the arcuate flanges 6 of the nipple of such width that when rolled or folded over the adjacent surface of the transformer shell, as shown in Fig. 2, they extend laterally over the shell considerably beyond the edge of the opening in the outlet box, that is to say, the outer diameter formed by the arcuate flanges 6 is substantially greater than the diameter of the opening in the outlet box, and as a result of this relationship, when the nut 17 is tightened, its pressure or pulling action is exerted against the outer portion of the flanges 6 and the portion of the shell laterally beyond the limits of the opening in the outlet box, so that there is no tendency for the portion of the shell immediately adjacent to the opening being squeezed or pressed into the opening. In this manner, the shell is definitely prevented from being distorted or its shape in any manner changed by repeated attachment to and removal from an outlet box.

While the invention has been described in connection with the particular construction shown, it is not confined to the details disclosed herein and this application is intended to cover such modifications or departures as may come within the purposes of the invention and the scope of the following claim.

I claim:

Means for attaching an electrical device through a circular opening of an outlet box or the like comprising a shell engaging one surface of a wall of the outlet box entirely around said opening and having a circular opening therein to receive a nipple, interlocking lugs on the shell extending radially of said shell opening, a cylindrical nipple having an exteriorly threaded portion positioned in said opening of the outlet box and spaced from the surrounding edge of the outlet box, said threaded portion terminating in a shoulder engaging said shell on one side thereof within said opening of the outlet box and having oppositely disposed spaced arcuate flanges engaging the shell on the opposite side thereof around said circular opening of the shell and located between the aforementioned interlocking lugs of the shell, and a nut mounted on said threaded portion of the nipple engaging the opposite surface of said wall of the outlet box, the nut operating to draw the shell toward the outlet box and to clamp the shell between the outlet box and said arcuate flanges on the nipple, said flanges on the nipple extending laterally of the shell for a substantial distance beyond the opening in the outlet box thereby preventing the edge of the shell from being forced into said opening of the outlet box when the nut is tightened to draw the flanges of the nipple against the shell and toward the outlet box.

LLOYD W. RITTENHOUSE.

REFERENCES CITED

The following references are of record in the file of this patent:

UNITED STATES PATENTS

| Number | Name | Date |
|---|---|---|
| 1,469,186 | Kuen | Sept. 25, 1923 |
| 1,631,393 | Andreoli | June 7, 1927 |
| 1,637,365 | Wernle | Aug. 2, 1927 |
| 2,414,143 | Dunning | Jan. 14, 1947 |
| 2,464,405 | Knauf | Mar. 15, 1949 |
| 2,533,933 | Heath | Dec. 12, 1950 |